United States Patent
Rejsa

[15] 3,680,616
[45] Aug. 1, 1972

[54] METHOD AND APPARATUS FOR SEVERING FOOD PRODUCTS

[72] Inventor: Jack J. Rejsa, Minneapolis, Minn.

[73] Assignee: The Pillsbury Company, Minneapolis, Minn.

[22] Filed: April 6, 1970

[21] Appl. No.: 25,639

[52] U.S. Cl. ............146/222, 146/133, 83/26, 83/38, 83/107, 83/314, 83/321
[51] Int. Cl. ...............................B26d 1/56
[58] Field of Search...146/131, 133, 132, 94 R, 94 B, 146/222; 83/26, 37, 38, 105, 107, 110, 314, 315, 321, 324

[56] References Cited

UNITED STATES PATENTS 2,661,707  12/1953  Clement ....................83/110

Primary Examiner—Willie G. Abercrombie
Attorney—Ronald E. Lund, James V. Harmon and M. Paul Hendrickson

[57] ABSTRACT

Several continuously extruded parallel strands of a food product are cut repeatedly with each cut being made at a different time. Each cut piece is then accelerated by a conveyor downstream from the cutter to separate them from one another in the direction of travel. This reduces the number of parallel product flow streams, for example, from 8 streams to 2 streams. The cut pieces are then fed to a packaging machine.

5 Claims, 4 Drawing Figures

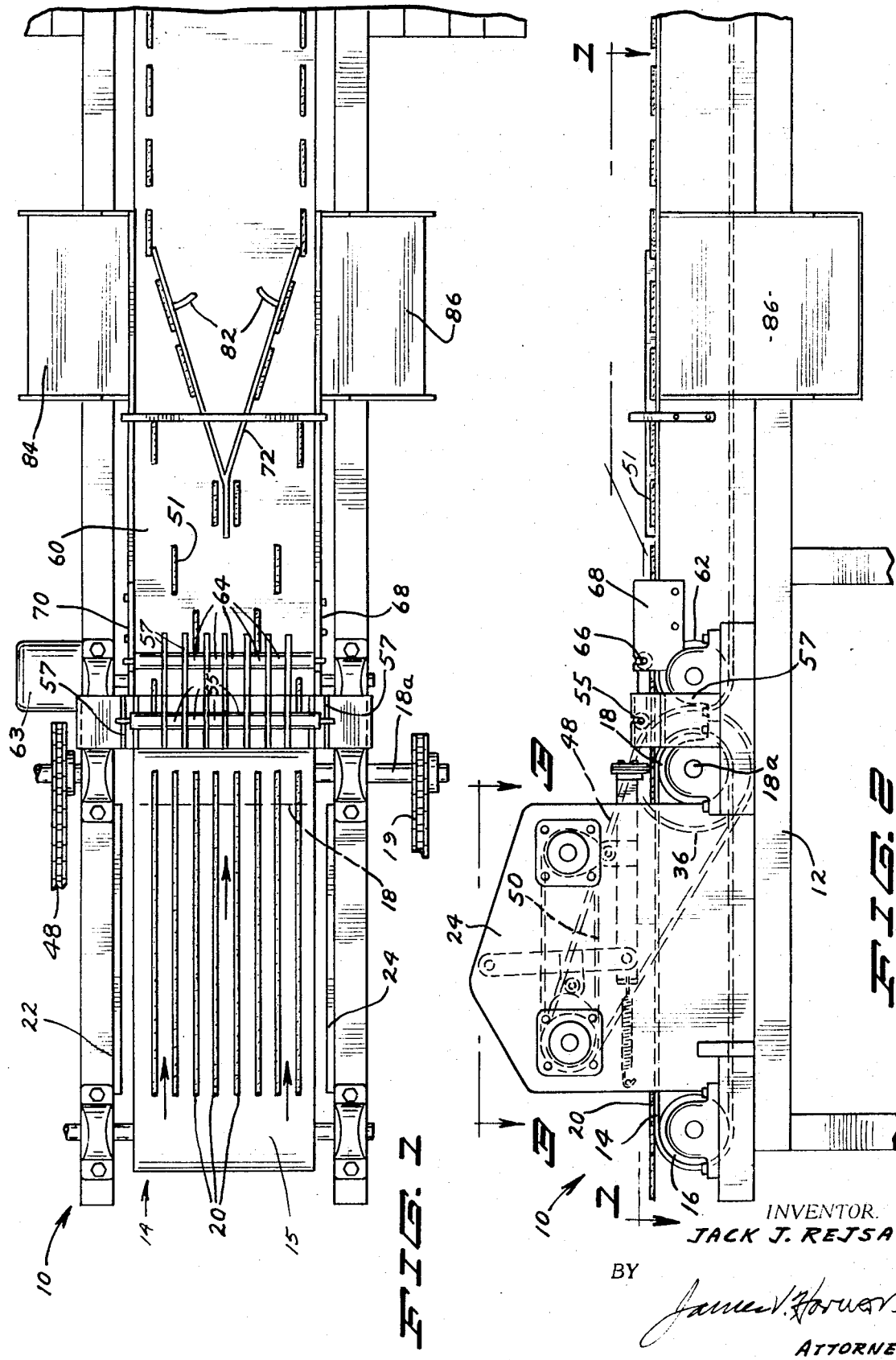

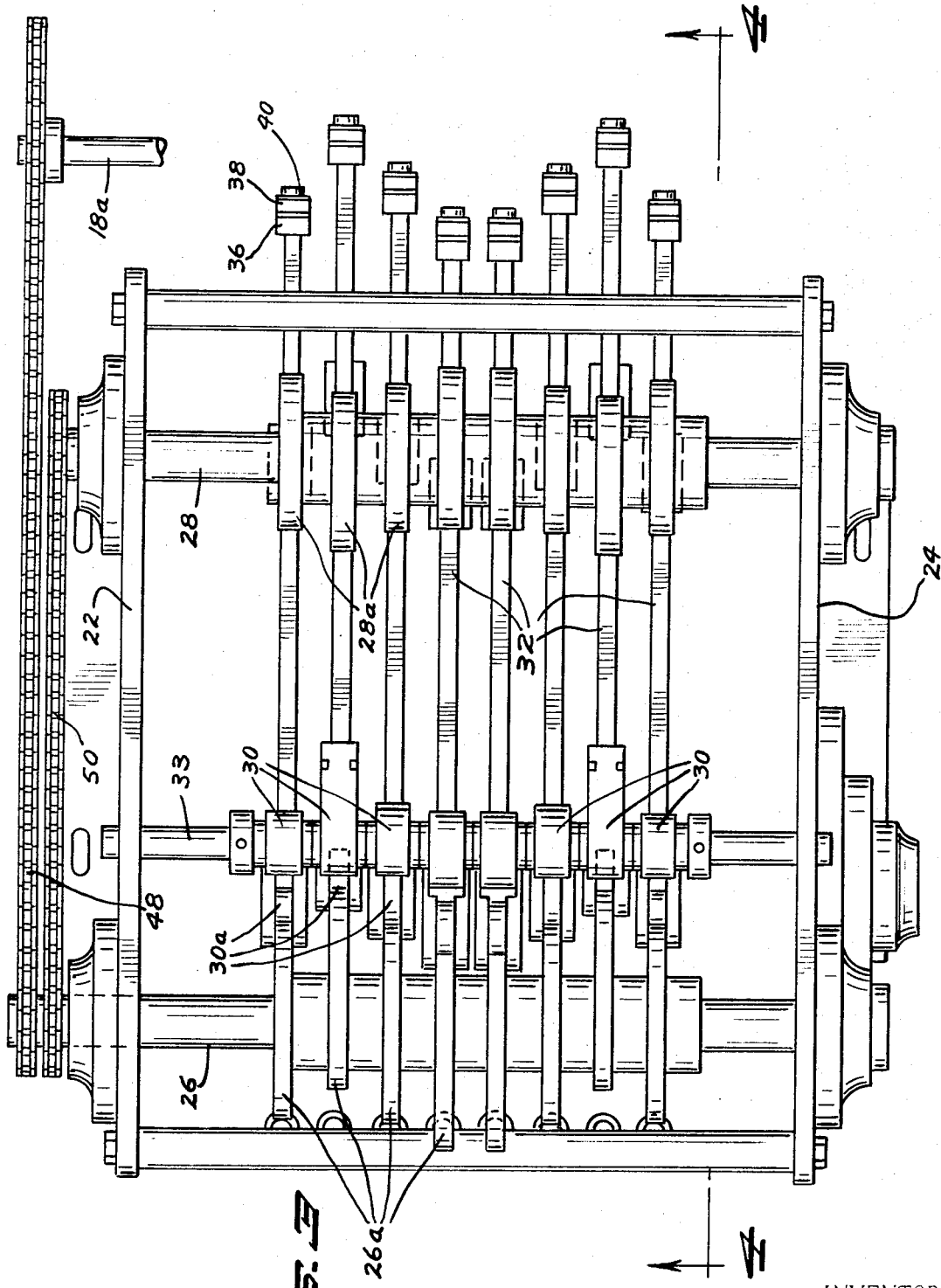

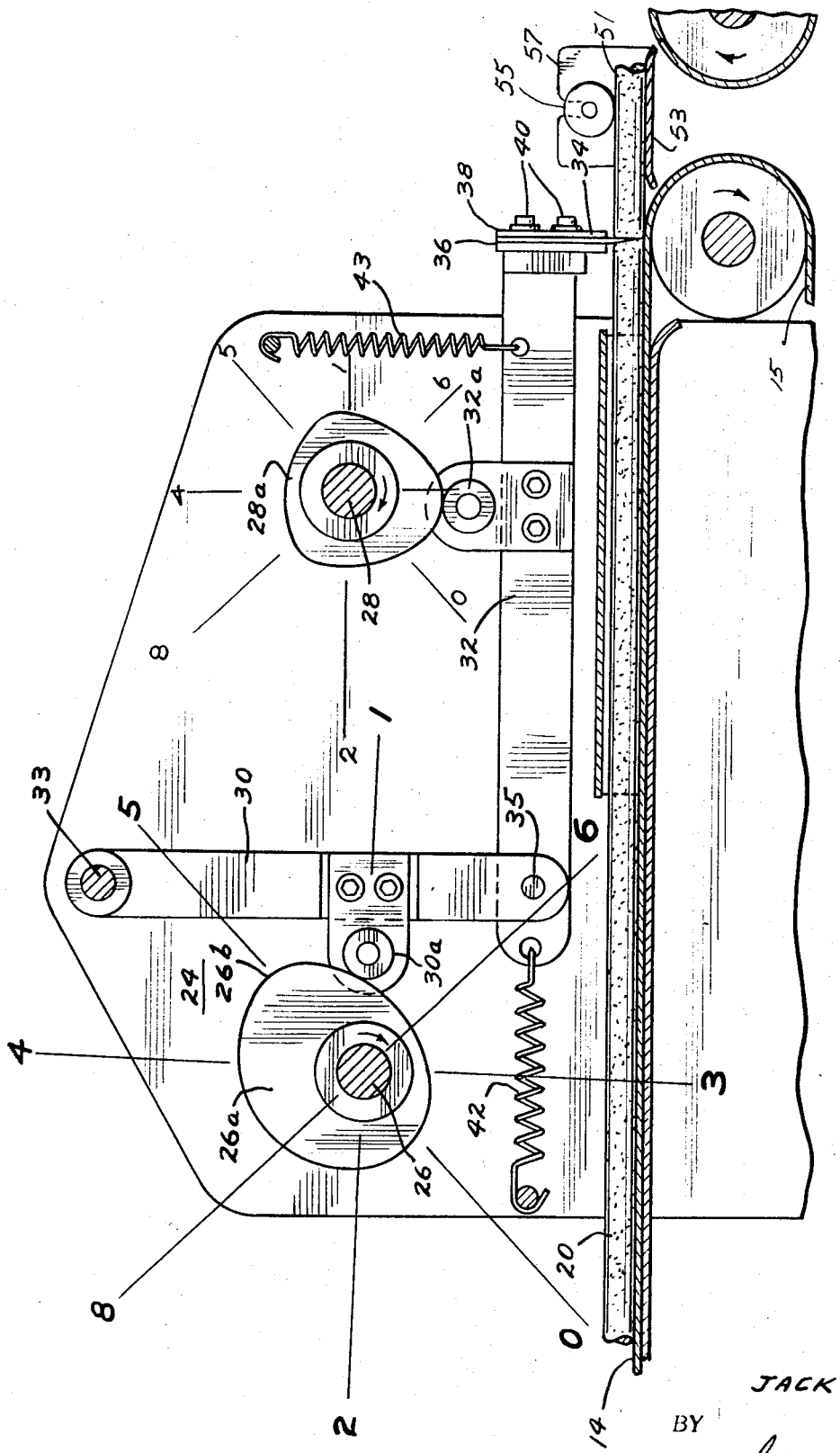

METHOD AND APPARATUS FOR SEVERING FOOD PRODUCTS

The present invention relates to the cutting and feeding of food products and more particularly to a system for repeatedly severing moving strands of a food product at longitudinally spaced locations and transferring the cut pieces away from the cutter.

In many food processing operations, for example, in the extrusion of food bars, candy, etc., it is desirable to provide a number of parallel continuously extruded strands and to reduce the number of parallel product flow paths before the strands are wrapped so that fewer packaging machines or other downstream processing devices are required.

It is the primary object of the invention to provide a system for processing food products having the following characteristics and advantages: (a) the accurate cutting and simultaneous separation of food products in strand form; (b) a reduction from as many as eight parallel flow paths or streams to as few as two streams of cut pieces; (c) the rapid acceleration of deformable food products without damage; (d) the effective separation of cut pieces; (e) a provision for cutting several moving strands at timed intervals and for accelerating each individual cutting blade to the speed of the strand travelling adjacent to it.

These and other more detailed and specific objects will be apparent in view of the following specification and drawings wherein:

FIG. 1 is a plan view of the invention.

FIG. 2 is a side elevational view of FIG. 1.

FIG. 3 is a plan view taken on line 3—3 of FIG. 2 on an enlarged scale.

FIG. 4 is a partial cross sectional view taken on line 4—4 of FIG. 3.

Briefly, the present invention provides a sequential cutting means for severing a plurality of parallel longitudinally extending moving streams of extruded strands of food at spaced intervals and a means for accelerating the cut pieces to a speed sufficient to allow the cut pieces to travel in a reduced number of streams. In accordance with the process of operation embodied in the invention, a food material is extruded or otherwise prepared and advanced as a plurality of parallel strands. The strands are severed at timed intervals and the cut pieces accelerated to a speed several times that of the original strands whereby the number of streams of strands is reduced in proportion to the speed differential between the strands and the cut pieces. The blades are preferably moved in an orbital path such that the blade movement coincides with that of the strands while the blades are engaged in the cutting position.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

In the figures is shown an apparatus 10 embodying the invention. The apparatus includes the supporting framework 12 composed of legs and longitudinally extending stringers upon which are mounted a first endless belt conveyor 14 composed of a belt 15 entrained between a pair of laterally extending parallel and longitudinally spaced rolls 16 and 18 suitably driven at the desired speed by a motor indicated generally by the numeral 19 through the shaft 18a of roll 18. A food product composed in this case of eight parallel longitudinally extended strands 20 pass from an extruder (not shown) to a conveyor belt 14 which carries them from left to right in FIGS. 1 and 2 through the apparatus and beneath a cutter composed of parallel longitudinally extending vertically disposed side plates 22 and 24 bolted or otherwise affixed to the frame 12, upon which are journaled for rotation a pair of parallel laterally extending cam shafts 26 and 28, each of which are provided with laterally spaced, longitudinally aligned cams 26a and 28a respectively. During operation, the cams control the movement of vertically disposed arms 30 and horizontally disposed cutter supporting arms 32 respectively. The arms 30 depend downwardly from a pivot pin 33 supported between plates 22 and 24 while the arms 32 are pivotally secured to the lower ends of arms 30 by hinges 35. The arms 30 are provided with cam-following rollers 30a engaging the cams 26a while the horizontal arms 32 are provided with cam-following rollers 32a engaging the cams 28a. Secured to the free end of the horizontal cutter arms 32 are vertically disposed cutter blades 34 which are held between retaining plates 36 and 38 by fasteners such as bolts 40. Springs 42 are connected to each of the arms 32 to yieldably bias them toward the left in the figures while springs 43 connected to each arm 32 yieldably bias the free end of each arm 32 upwardly against its associated cam 28a.

In operation, as the strands 20 are advanced by the conveyor 14 from left to right in the figures, rotation of the sprocket 36 affixed to shaft 18a driving through chain and sprocket assembly 48 to shaft 26 and through chain and sprocket assembly 50 (FIG. 3) will drive cam shafts 26 and 28 in timed relationship with respect to the advancing strands 20. The speed of the strands is in turn controlled by the conveyor 14. The cams 26a advance each one of the blades 34 from left to right while the cams 28a lower the knives 34 to their cutting positions. As soon as the strands 20 have been cut, the rotation of cams 28a allows the arms 32 and the blades 34 to be raised by springs 43. The cams 26a allow the arms and blades to move from right to left under the influence of springs 42.

In FIG. 4, the radial spacing of each of the cams 26a and 28a is indicated by numerals 1–8. This provision causes the strands to be cut in sequence at 45° intervals with reference to rotation of the shafts 26 and 28. Each cam 26a is shaped to cause the last movement of the arm 32 and the blade 34 in the direction of the strands 20 to be at a speed slightly faster than that of the strands themselves to efficiently separate the pieces 51 from the strands. The cut pieces 51 are accelerated after being cut to space them from one to another longitudinally.

The required acceleration is accomplished by means of an endless belt conveyor 60 supported between a pair of laterally disposed longitudinally spaced supporting rolls 62 (only one of which is shown). Conveyor 60 is driven during operation by a drive motor 63 (FIG. 1) at about four times the speed of the conveyor 14 so as to carry away the cut pieces 51 in longitudinally spaced relationship. Cut pieces 51 are held momentarily by engagement between a dead plate 53 and laterally spaced idler rolls 55 each individually mounted for vertical sliding motion between plates 57 as well as for rotation on its own axis. The cut pieces are then accelerated quickly by engagement between the conveyor 60 and one of idler rolls 64 each mounted for vertical sliding movement within vertically disposed notches 66 in each of support plates 57, 68 and 70. It should be noted that the reduction in the number of streams of material is proportionate to the speed differential between the take-away conveyor 60 and the speed of the strands as they are carried from left to right by the conveyor 14.

As the cut pieces 51 travel toward the right in the figures, they engage a spreader 72 and are deflected toward the side of conveyor 60. The cut pieces are further deflected if downstream equipment becomes jammed by compressed air fed through lines 82 with sufficient pressure to force the cut pieces 51 into chutes 84 and 86 until the problem is corrected.

I claim:

1. An apparatus for cutting and feeding strands of food material arranged in a plurality of parallel laterally spaced longitudinally extending rows comprising a plurality of sequential cutting means, one such cutting means for severing each strand, means operatively associated between the cutting means to time the cut made by each cutting means to cut the strands at predetermined spaced time intervals and an accelerating means adjacent each cutting means for carrying away the cut pieces at a faster rate than the strands themselves move whereby the number of streams of strands is reduced in proportion to the speed differential between the strands and the cut pieces.

2. The apparatus of claim 1 wherein the cutting means comprises a plurality of spaced-apart cams, each cam being mounted upon a cam shaft at a selected angular spacing with relation to the shaft, a plurality of cutting blades each operatively engaged with one of the cams for movement toward and away from the strand as the cams rotate and a means is provided for moving each blade in the same direction and speed that the strand moves whereby rotation of the cams on the shaft will cause the blades to sever the strands at different times.

3. The apparatus of claim 1 wherein a plurality of blade-supporting arms are provided, each arm including the first and second articulated portions, a blade on each arm, a first set of cams is mounted on a first shaft for an engagement with the first portion of each arm to move each of the blades in a plane generally parallel to the strands and a second set of cams is engaged with the second portion of each arm for moving each blade along a path normal to the strands for cutting the strands.

4. The apparatus of claim 1 wherein a plurality of blade-supporting arms are provided including the first and second articulated portions, a first set of cams is mounted on a first shaft for an engagement with the first portion to move each of the blades in a plane generally parallel to the strands, a second set of cams is engaged with the second portion of each arm for moving each blade normal to the strands and an accelerating take-away conveyor is positioned adjacent the cutting means for receiving the cut pieces, said take-away conveyor comprising a conveyor element and a means positioned in spaced relationship therefrom for engaging each cut piece between itself and the take-away conveyor whereby the cut pieces are quickly accelerated.

5. A method of cutting a plurality of parallel moving strands of a food product lying side-by-side comprising utilizing a plurality of cutters each operating on one of said strands, the cutters operating sequentially on different strands, sequentially cutting said strands at different timed intervals, a cut-piece takeway means to withdraw the pieces at a higher speed than before being cut thereby advancing the cut pieces away from the cutter at a faster speed than the original strands whereby the cut pieces are spaced longitudinally from one another thereby reducing the number of original strands to rows of cut pieces.

* * * * *